United States Patent
Boahene et al.

(10) Patent No.: US 9,217,355 B2
(45) Date of Patent: Dec. 22, 2015

(54) SENSOR MOUNTING ARRANGEMENT

(75) Inventors: Michael P. Boahene, Dunlap, IL (US);
Ethan D. Sanborn, Peoria, IL (US);
Kristian N. Engelsen, Peoria, IL (US);
Andrew M. Denis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1042 days.

(21) Appl. No.: 13/316,941

(22) Filed: Dec. 12, 2011

(65) Prior Publication Data

US 2013/0145820 A1  Jun. 13, 2013

(51) Int. Cl.
*F01N 13/18* (2010.01)
*F01N 13/00* (2010.01)
*F01N 3/20* (2006.01)
*F02D 41/14* (2006.01)
*F02D 41/26* (2006.01)

(52) U.S. Cl.
CPC ............ *F01N 13/008* (2013.01); *F01N 13/017* (2014.06); *F01N 3/2066* (2013.01); *F01N 2470/22* (2013.01); *F01N 2560/026* (2013.01); *F01N 2560/14* (2013.01); *F01N 2590/10* (2013.01); *F02D 41/146* (2013.01); *F02D 41/1441* (2013.01); *F02D 41/266* (2013.01)

(58) Field of Classification Search
CPC ............. F01N 13/008; F01N 2470/22; F01N 2560/026; F01N 3/2066
See application file for complete search history.

(56) References Cited

U.S. PATENT DOCUMENTS

| | | | |
|---|---|---|---|
| 3,444,740 A * | 5/1969 | Davis | G01K 1/143 136/228 |
| 3,648,524 A * | 3/1972 | Dahle | 73/728 |
| 4,559,995 A * | 12/1985 | Van der Stuyf | F01P 3/12 123/198 E |
| 4,713,523 A | 12/1987 | Macdonald | |
| 4,875,140 A * | 10/1989 | Delpech | H05K 7/142 174/138 D |
| 4,899,256 A * | 2/1990 | Sway-Tin | H05K 7/20854 361/715 |
| 5,566,047 A | 10/1996 | Kahn et al. | |
| 5,605,042 A * | 2/1997 | Stutzenberger | B01D 53/9431 60/286 |
| 6,302,190 B1 * | 10/2001 | Clamp et al. | B60R 16/0239 165/169 |
| 6,396,692 B1 * | 5/2002 | Farshi et al. | 361/690 |
| 6,513,323 B1 * | 2/2003 | Weigl et al. | B01D 53/9431 137/340 |
| 6,762,944 B2 * | 7/2004 | Mizusaki | H05K 1/0271 361/742 |
| 6,867,968 B2 | 3/2005 | Katsuro et al. | |
| 6,996,976 B2 * | 2/2006 | Rumminger et al. | F01N 13/008 204/421 |
| 7,057,895 B2 | 6/2006 | Mejia et al. | |
| 7,120,024 B2 | 10/2006 | Watanabe et al. | |
| 7,192,463 B2 | 3/2007 | Shutty et al. | |
| 7,500,356 B2 * | 3/2009 | Hirata et al. | B01D 53/9431 222/149 |
| 7,601,021 B1 | 10/2009 | Yang | |
| 7,765,801 B2 * | 8/2010 | Hill, Jr. et al. | F01N 3/2853 60/276 |
| 7,932,480 B2 | 4/2011 | Gu et al. | |
| 7,966,979 B2 * | 6/2011 | Olsen et al. | F01N 13/00 123/195 A |
| 8,721,977 B2 * | 5/2014 | Wikaryasz et al. | F01N 13/141 422/179 |

(Continued)

*Primary Examiner* — Lisa Caputo
*Assistant Examiner* — Punam Roy
(74) *Attorney, Agent, or Firm* — John Stankiewicz (57) ABSTRACT

An arrangement for mounting at least one electrical component to a portion of an aftertreatment module, the arrangement including; at least one standoff member coupled between the electrical component and the portion of the aftertreatment module, and an enclosure substantially surrounding at least three sides of the electrical component.

10 Claims, 8 Drawing Sheets

(56) References Cited

U.S. PATENT DOCUMENTS

| | | | |
|---|---|---|---|
| 2003/0226412 A1* | 12/2003 | Rumminger et al. | F01N 13/008 73/866.5 |
| 2004/0141292 A1 | 7/2004 | Onizuka et al. | |
| 2006/0207352 A1 | 9/2006 | Wass et al. | |
| 2007/0163765 A1* | 7/2007 | Rondier et al. | H01L 23/473 165/170 |
| 2010/0031644 A1* | 2/2010 | Keane et al. | 60/295 |
| 2010/0186388 A1* | 7/2010 | Olsen et al. | F01N 13/00 60/295 |
| 2011/0079003 A1* | 4/2011 | Sun et al. | F01N 3/2066 60/310 |
| 2015/0013316 A1* | 1/2015 | Spooner et al. | F01N 13/00 60/323 |
| 2015/0059457 A1* | 3/2015 | Niaz | F01N 3/2892 73/114.71 |

* cited by examiner

SENSOR MOUNTING ARRANGEMENT

TECHNICAL FIELD

The present disclosure relates to an exhaust system, and more particularly, to an aftertreatment module and sensor mount.

BACKGROUND

Internal combustion engines, including diesel engines, gasoline engines, gaseous-fuel powered engines, and other engines known in the art generate a complex mixture of exhaust gases and particulates. Components of the exhaust gases may include, among other things, oxides of nitrogen (NOx). Exhaust emission standards have become more stringent, and the amount of NOx emitted to the atmosphere by an engine may be regulated depending on the type, size and/or class of engine.

In order to comply with the regulation of NOx, some engine manufacturers have implemented a strategy called selective catalytic reduction (SCR). SCR is an exhaust aftertreatment process where a reductant, most commonly urea $((NH_2)_2CO)$ or a water and urea solution, is selectively injected into the exhaust gas stream of an engine and adsorbed onto a downstream substrate. The injected urea solution decomposes into ammonia ($NH_3$), which reacts with NOx in the exhaust gas to form water ($H_2O$) and diatomic nitrogen ($N_2$).

Temperatures associated with SCR implementation may approach or exceed 200° C. In particular, high temperature exhaust gases and heat generated by exothermic reactions within aftertreatment components may heat the packaging of the SCR system. Removal of heat from the SCR system is especially problematic in stationary applications where airflow over the system may not be sufficient to readily cool the system. This high temperature environment presents particular problems for locating sensors and associated electronics required for ensuring emissions compliance.

U.S. Pat. No. 7,192,463 discloses an arrangement for disposing sensor electronics on a diesel particulate filter.

SUMMARY

This disclosure provides an arrangement for mounting at least one electrical component to a portion of an aftertreatment module, the arrangement including: at least one standoff member coupled between the electrical component and the portion of the aftertreatment module, and an enclosure substantially surrounding at least three sides of the electrical component.

Other features and aspects of this disclosure will be apparent from the following description and the accompanying drawings.

DETAILED DESCRIPTION

Figure 1:
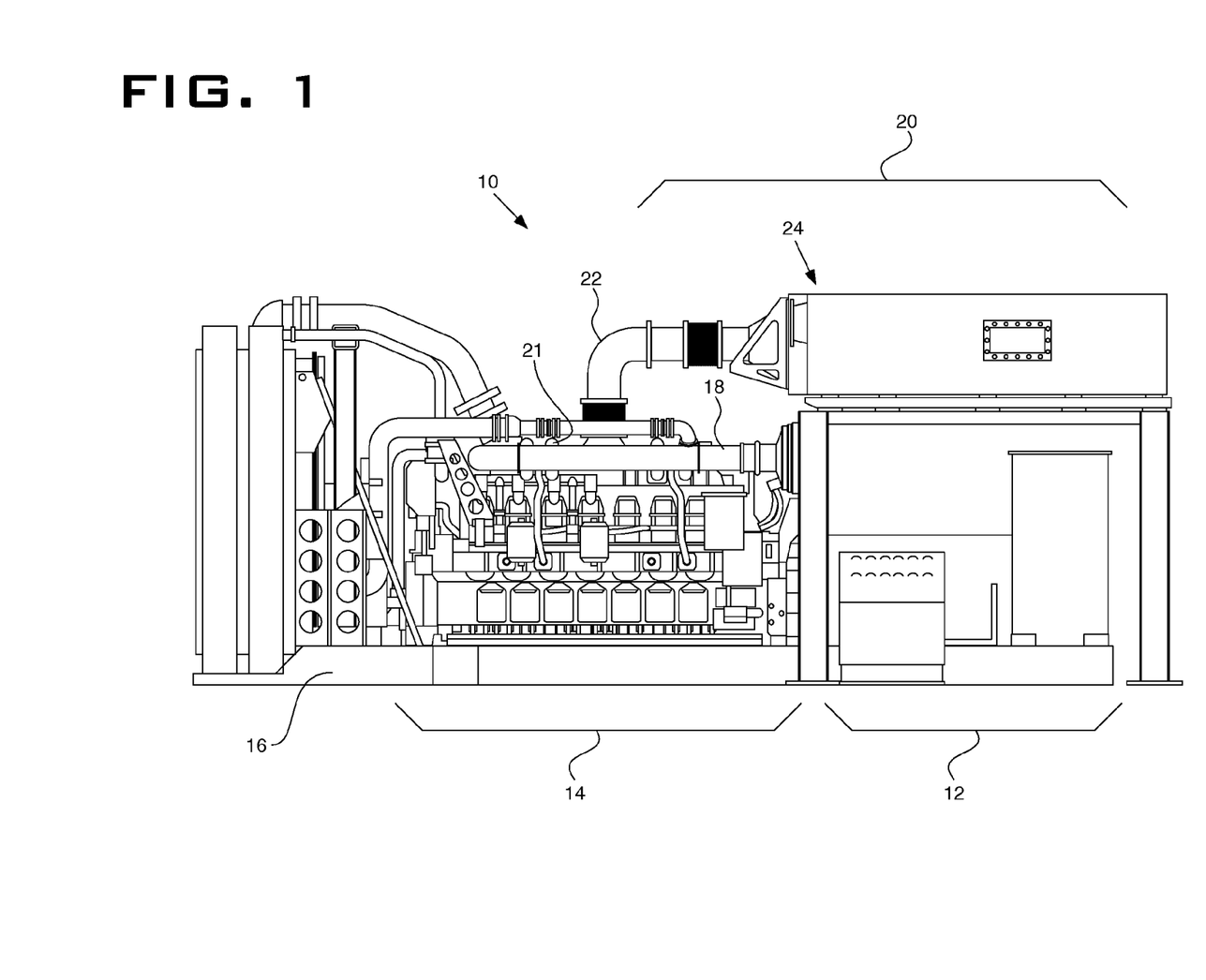
FIG. 1 is a side elevation view of an embodiment of a disclosed power system.

FIG. 1 illustrates an exemplary power system 10. For the purposes of this disclosure, power system 10 is depicted and described as a gen-set including a generator 12 powered by a multi-cylinder internal combustion engine 14. Generator 12 and engine 14 may be generally coupled by a frame 16. It is contemplated, however, that power system 10 may embody another type of power system, if desired, such as one including a diesel, gasoline, or gaseous fuel-powered engine associated with a mobile machine, such as a locomotive, or a stationary machine, such as a pump.

Multiple separate sub-systems may be included within power system 10 to promote power production. For example, power system 10 may include among other things, an air induction system 18 and an exhaust system 20. Air induction system 18 may be configured to direct air or an air/fuel mixture into the combustion chamber(s) of power system 10 for subsequent combustion. Exhaust system 20 may treat and discharge byproducts of the combustion process to the atmosphere. Air induction and exhaust systems 18, 20 may be mechanically coupled to each other by way of one or more turbochargers 21.

Exhaust system 20 may include components that condition exhaust from the cylinders of engine 14 and direct it to the atmosphere. For example, exhaust system 20 may include one or more exhaust passages 22 fluidly connected to the cylinders of engine 14, one or more turbines of the turbochargers 21 driven by exhaust flowing through exhaust passages 22, and an aftertreatment module 24 connected to receive and treat exhaust from exhaust passages 22. As the hot exhaust gases exiting the cylinders of engine 14 move through the one or more turbines and expand against vanes (not shown) thereof, the one or more turbines may rotate and drive one or more compressors of the turbochargers 21 of the air induction system 18 to pressurize inlet air. Aftertreatment module 24 may treat, condition, and/or otherwise reduce constituents of the exhaust generated by engine 14 before the exhaust is discharged to the atmosphere.

Figure 2:
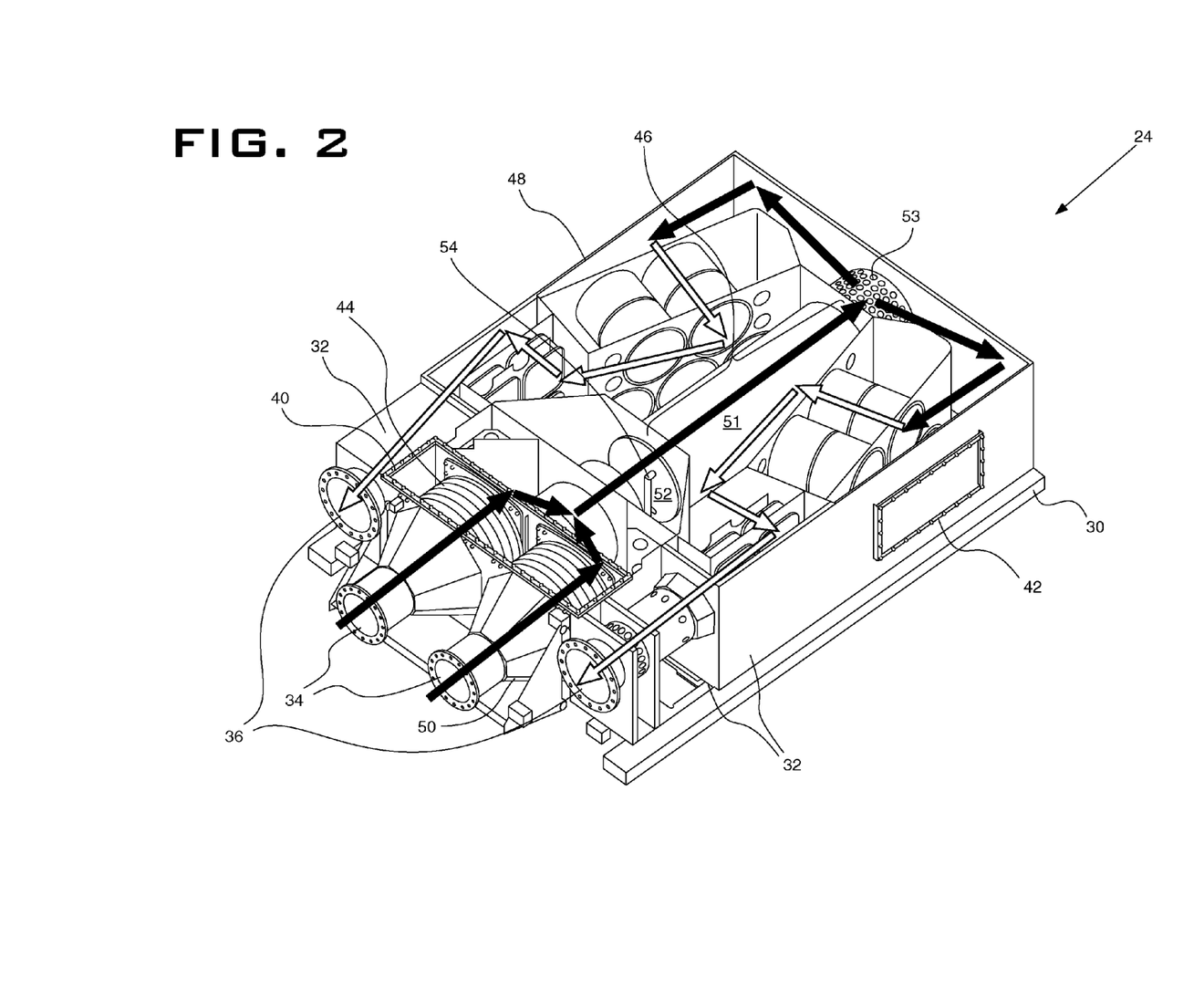
FIG. 2 is an isometric cut-away view of an embodiment of an aftertreatment module of the disclosed power system illustrating an exhaust flow path through the aftertreatment module.

As shown in FIG. 2, aftertreatment module 24 may include a base support 30, a generally box-like housing 32 (elements of which are illustrated as being transparent in order to clearly show internal elements of the aftertreatment module 24), one or more inlets 34, and one or more outlets 36. Base support 30 may be fabricated from, for example, a mild steel, and rigidly connected to frame 16 of power system 10 (referring to FIG. 1). Housing 32 may be fabricated from, for example, welded stainless steel, and connected to base support 30 in such a way that housing 32 can thermally expand to some degree relative to base supported 30 when housing 32 is exposed to elevated temperatures. Inlets 34 and outlets 36 may be located at one end of housing 32 such that flows of exhaust may exit housing 32 in a direction substantially opposite to the flow of exhaust entering housing 32. Inlets 34 may be operatively coupled to exhaust passages 22 (referring to FIG. 1) while outlets 36 may be operatively connected to passages leading to the atmosphere, e.g., additional exhaust tubing leading to an exterior space (not shown). One or more access panels, for example a pair of oxidation catalyst access panels 40 and a pair of SCR catalyst access panels 42, may be located at strategic locations on housing 32 to provide service access to internal components of aftertreatment module 24.

Aftertreatment module 24 may house a plurality of exhaust treatment devices. For example, FIG. 2 illustrates aftertreatment module 24 as housing a first aftertreatment device consisting of one or more banks of diesel oxidation catalysts ("DOCs") 44, a second aftertreatment device consisting of a reductant dosing arrangement 46, and a third aftertreatment device consisting of one or more banks of SCR catalysts 48. It is contemplated that aftertreatment module 24 may include a greater or lesser number of aftertreatment devices of any type known in the art, as desired. DOCs 44 may be located downstream of inlets 34 and, in one embodiment, also downstream of a diffuser 50 associated with the inlets 34. Reductant dosing arrangement 46 may be located downstream of DOCs 44 and upstream of SCR catalysts 48.

FIG. 2 illustrates exhaust flow through the aftertreatment module 24. Exhaust enters the aftertreatment module 24 via the inlets 34. The exhaust passes through the diffusers 50 and into the DOCs 44. After passing through the DOCs 44, the exhaust is exposed to the reductant dosing arrangement 46 through a mixing duct 51. After passing through the reductant dosing arrangement 46, the exhaust flows through the SCR catalysts 48. Next, the exhaust may flow through clean up catalysts 55 before exiting the aftertreatment module 24 through outlets 36.

The DOCs 44 may each include a porous ceramic honeycomb structure, a metal mesh, a metal or ceramic foam, or another suitable substrate coated with or otherwise containing a catalyzing material, for example a precious metal, that catalyzes a chemical reaction to alter a composition of exhaust passing through DOCs 44. In one embodiment, DOCs 44 may include palladium, platinum, vanadium, or a mixture thereof that facilitates a conversion of NO to $NO_2$. In another embodiment, DOCs 44 may alternatively or additionally perform particulate trapping functions (i.e., DOCs 44 may be a catalyzed particulate trap), hydro-carbon reduction functions, carbon-monoxide reduction functions, and/or other functions known in the art.

Figure 3:
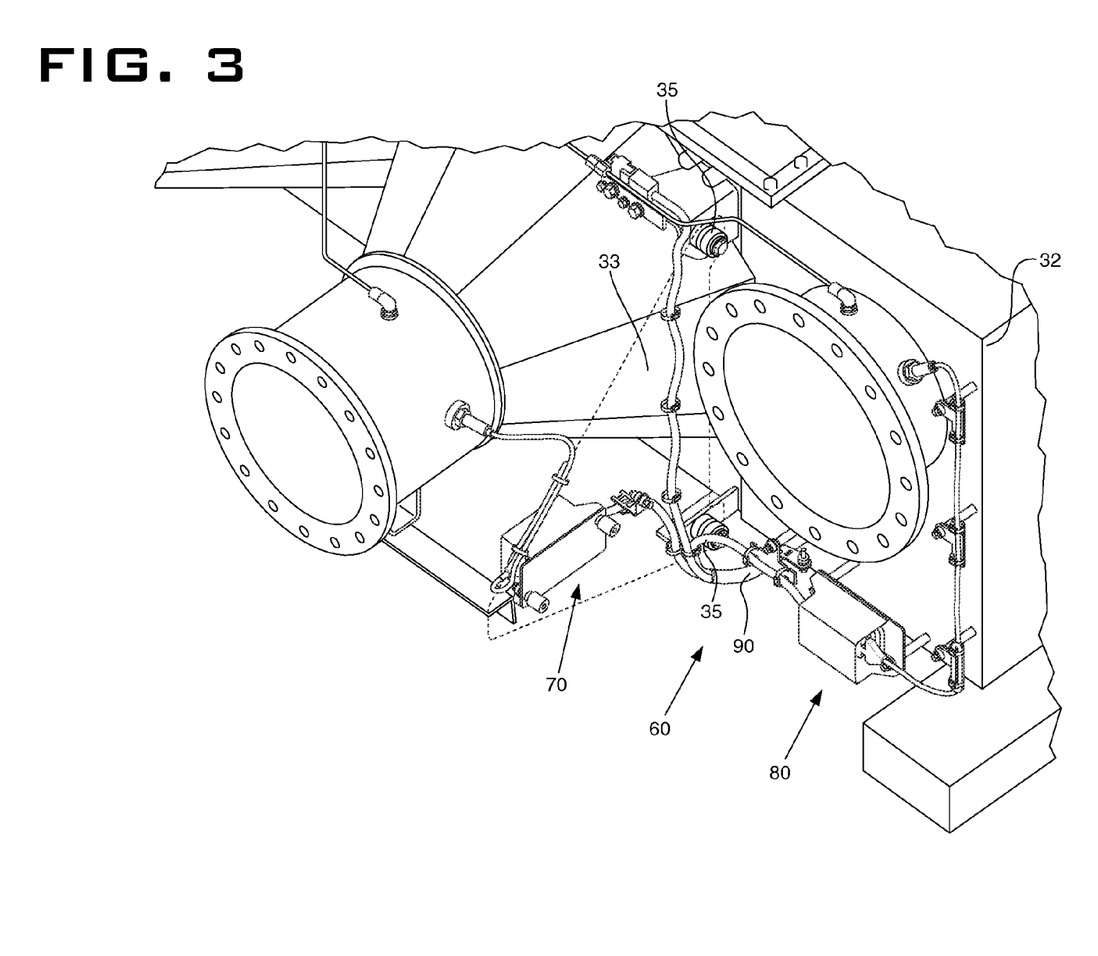
FIG. 3 is an enlarged view of a portion of the aftertreatment module of FIG. 2.

In the depicted embodiment, two separate banks of DOCs 44 are disclosed as being arranged to receive exhaust in parallel from a pair of inlets 34. Each bank of DOCs 44 may include two or more substrates disposed in series and configured to receive exhaust from one inlet 34 and one associated diffuser 50. In the depicted embodiment, diffuser 50 is configured as a cone or multiple concentric cones, although any diffuser geometry known in the art may be utilized. In the arrangement of FIGS. 2 and 3, each diffuser 50 may be configured to distribute exhaust received from the corresponding inlet 34 in a substantially uniform manner across a face of a leading substrate of the associated bank of DOCs 44. In one example, a space may exist between substrates of a single bank of DOCs, if desired, the space simultaneously promoting exhaust distribution and sound attenuation. It is contemplated that any number of banks of DOCs 44 including any number of substrates arranged in series or parallel may be utilized within aftertreatment module 24, as desired.

The mixing duct 51 has an upstream open end 52 in fluid communication with the output of the DOCs 44 and a downstream end 53 in fluid communication with the one or more banks of SCR catalysts 48. A reductant injector 54 may be located at or near upstream open end 52 and configured to inject a reductant into the exhaust flowing through mixing duct 51. A gaseous or liquid reductant, most commonly a water/urea solution, ammonia gas, liquefied anhydrous ammonia, ammonium carbonate, an amine salt, or a hydrocarbon such as diesel fuel, may be sprayed or otherwise advanced into the exhaust passing through mixing duct 51.

Reductant injector 54 may be located a distance upstream of SCR catalysts 48 and at an inlet portion of mixing duct 51 to allow the injected reductant sufficient time to mix with exhaust from power system 10 and to sufficiently decompose before entering SCR catalysts 48. That is, an even distribution of sufficiently decomposed reductant within the exhaust passing through SCR catalysts 48 may enhance $NO_x$ reduction therein. The distance between reductant injector 54 and SCR catalysts 48 may enhance $NO_x$ reduction therein. The distance between reductant injector 54 and SCR catalysts 48 (i.e., the length of mixing duct 51) may be based on a flow rate of exhaust exiting power system 10 and/or on a cross-sectional area of mixing duct 51. In the example depicted in FIGS. 2 and 3, mixing duct 51 may extend a majority of a length of housing 32, with reductant injector 54 being located at upstream open end 52.

Each SCR catalyst 48 may be substantially identical in shape, size and composition. In particular, each SCR catalyst 48 may include a generally cylindrical substrate fabricated from or otherwise coated with a ceramic material such as titanium oxide; a base metal oxide such as vanadium and tungsten; zeolites; and/or a precious metal. With this composition, decomposed reductant entrained within the exhaust flowing through mixing duct 51 may be adsorbed onto the surface and/or adsorbed within each SCR catalyst 48, where the reductant may react with $NO_x$ (either NO, $NO_2$ or both) in the exhaust gas to form water ($H_2O$) and diatomic nitrogen ($N_2$).

Figure 4:
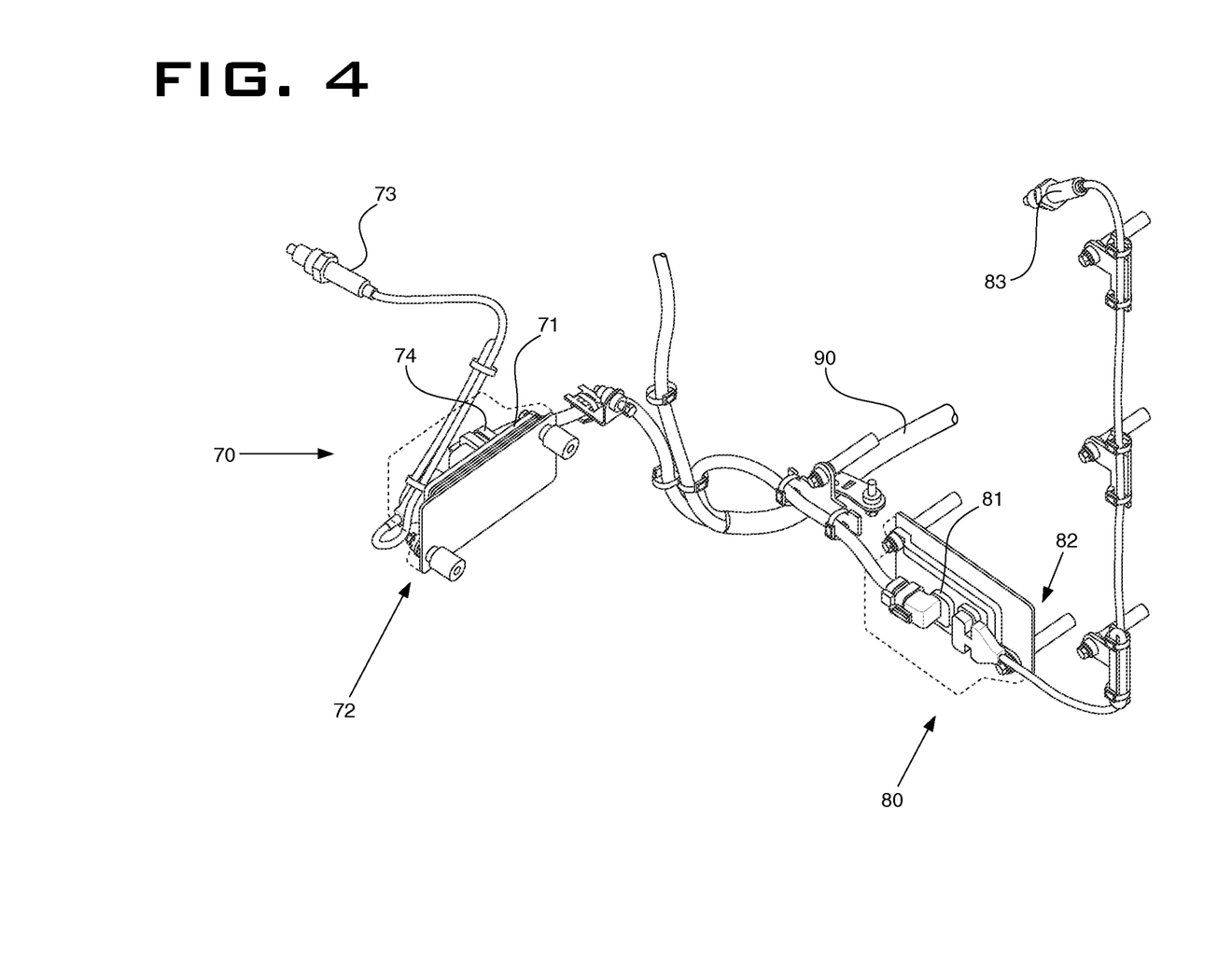
FIG. 4 is a side elevation view of an embodiment of a sensor system of the disclosed aftertreatment module.

In order to monitor the operation of aftertreatment module 24 and/or satisfy certain requirements established by various emissions regulations, various sensors and associated electronics may be disposed throughout the aftertreatment module 24. In particular, FIGS. 2-4 illustrate a sensor system 60 for monitoring constituents of exhaust gases in the aftertreatment module 24. In the illustrated embodiments, the sensor system 60 includes two arrangements for respectively mounting at least one electrical component to the aftertreatment module 24. A first mounting arrangement 70 includes at least one electrical component shown here as a first sensor electronic control unit (ECU) 71 and a first sensor thermal isolating arrangement 72 coupled to the first sensor ECU 71 (for clarity, portions of the aftertreatment module 24 and first sensor thermal isolating arrangement 72 in FIGS. 3 and 4 are illustrated as being transparent in order to more readily display the first sensor ECU 71). A second mounting arrangement 80 includes at least one electrical component shown here as a second sensor ECU 81 and a second sensor thermal isolating arrangement 82 coupled to the second sensor ECU 81 (for clarity, portions of the aftertreatment module 24 and second sensor thermal isolating arrangement 82 in FIGS. 3 and 4 are illustrated as being transparent in order to more readily display the second sensor ECU 81). In the illustrated embodiment, the first mounting arrangement 70 includes an exhaust inlet NOx sensor 73 and the second mounting arrangement 80 includes an exhaust outlet NOx sensor 83. However, alternative embodiments include configurations wherein the sensor system 60 may include additional and/or alternative sensors, such as temperature sensors, humidity sensors, particulate sensors, etc.

As illustrated in FIGS. 2 and 3, the first mounting arrangement 70 is disposed on a mounting bracket 33 (illustrated as being transparent in FIG. 3 for clarity) which extends from the housing 32. In one embodiment, the mounting bracket 33 may be thermally insulated from the housing 32 by thermal spacers 35. In the illustrated embodiment, the second mounting arrangement 80 is disposed on a face of housing 32. However, alternative embodiments include configurations wherein the first and second mounting arrangements 70 and 80 may be variously disposed on the aftertreatment module 24.

The first sensor ECU 71 and the second sensor ECU 81 receive input signals from the inlet $NO_x$ sensor 73 and the outlet $NO_x$ sensor 83, respectively. The first sensor ECU 71 and the second sensor ECU 81 process the received input signals and transmit the processed signals to an aftertreatment control ECU (not shown) via a wiring harness 90. The aftertreatment control ECU may interpret the processed signals from the ECUs 71 and 81 to control engine operating characteristics and/or reductant dosing characteristics in order to maintain the desired performance of aftertreatment module 24. Embodiments include configurations wherein the aftertreatment control ECU may be a separate component, the aftertreatment control may be integrated into a main ECU used for all engine controls, or various other similar configurations.

Figure 5:
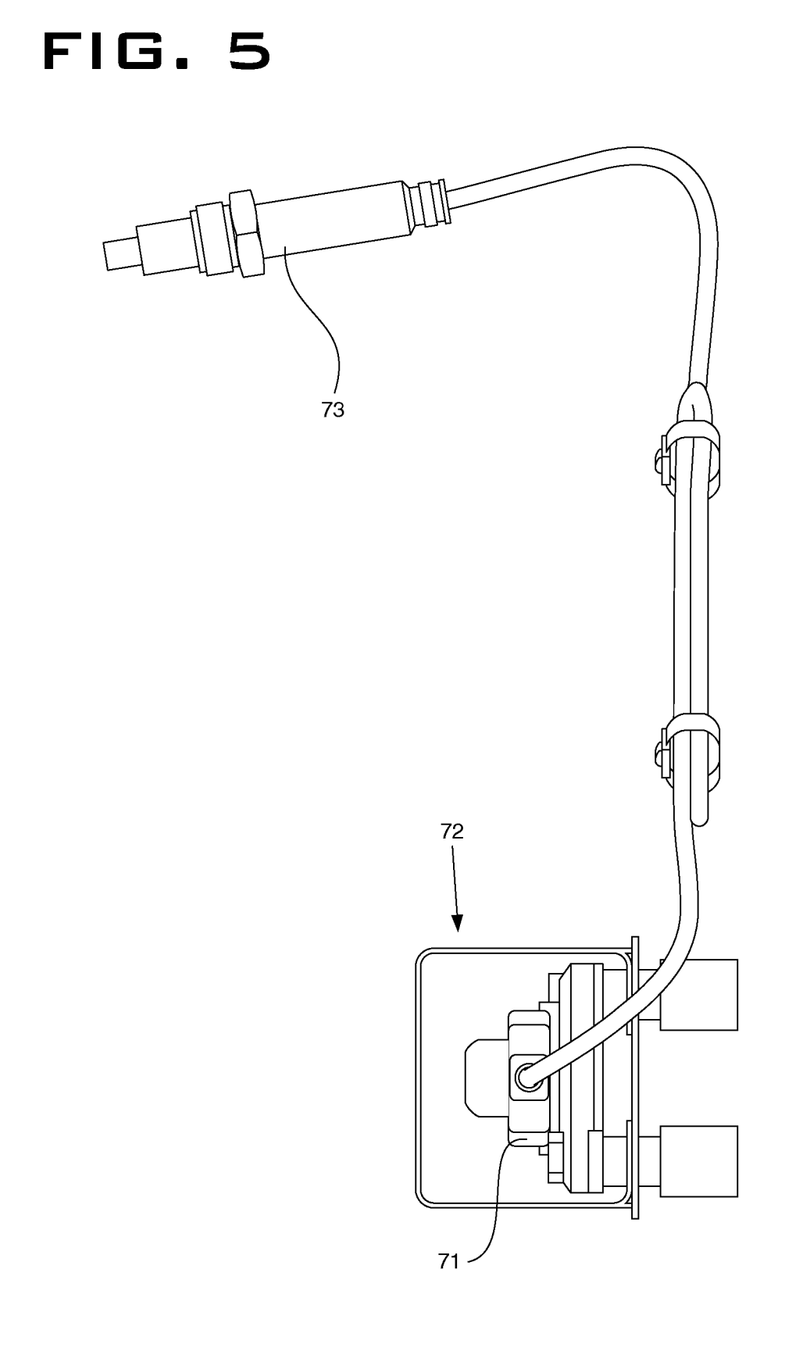
FIG. 5 is a side elevation view of an embodiment of an inlet sensor electronic control unit (ECU) and mounting arrangement of the disclosed sensor system.
Figure 6:
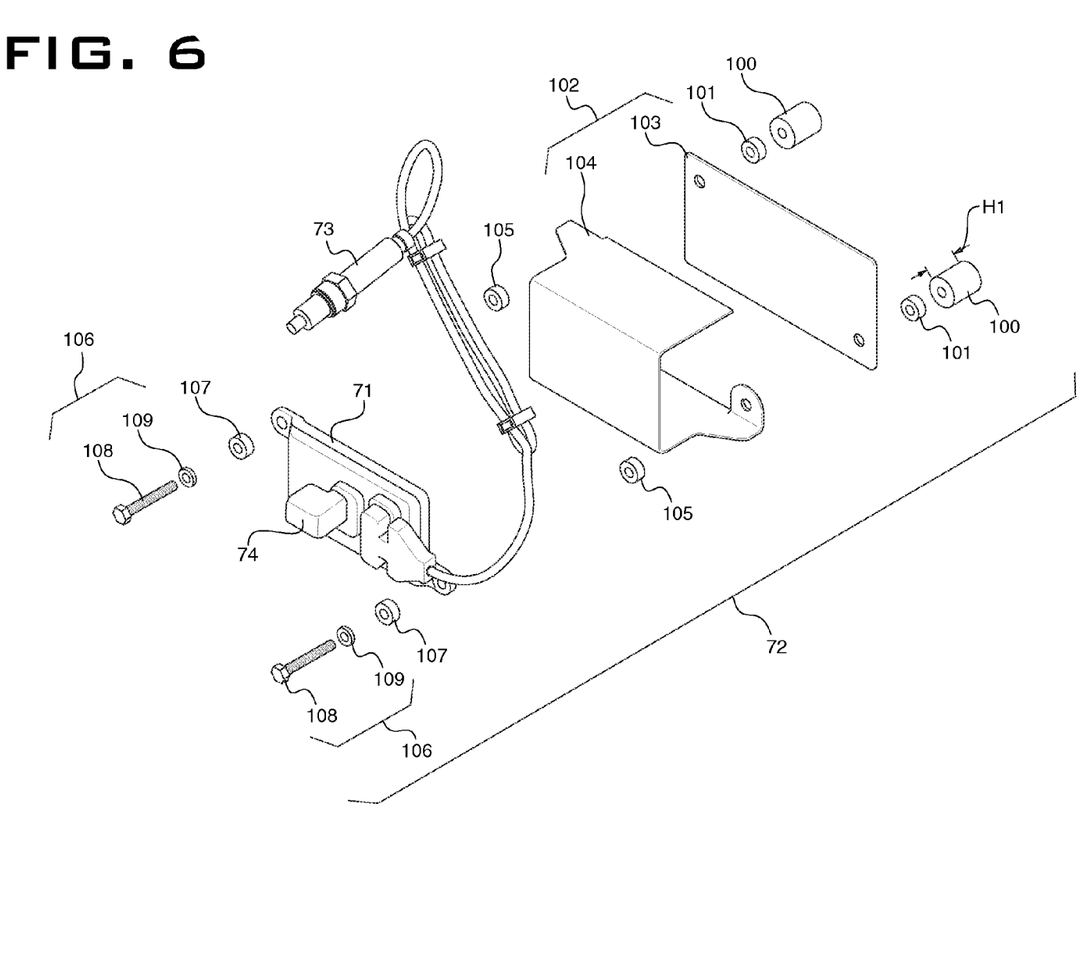
FIG. 6 is an exploded view of the inlet sensor ECU and mounting arrangement of the disclosed sensor system.

Referring now to FIGS. 4-6, the first mounting arrangement 70 includes the inlet $NO_x$ sensor 73, the first sensor ECU 71 and the first sensor thermal isolating arrangement 72. The first sensor ECU 71 includes a port 74 for receiving the wiring harness 90 and a connection to the inlet NOx sensor 73. In the present embodiment, the first sensor thermal isolating arrangement 72 includes a plurality of components as described in detail below.

The first sensor thermal isolating arrangement 72 includes two standoff members 100. The two standoff members 100 may be made from a thermally insulating material relative to the mounting bracket 33 to which they are coupled. While the illustrated embodiment includes two standoff members 100, alternative embodiments may include additional standoff members (not shown) or fewer standoff members (not shown); in general a smaller number of standoff members decreases a flow path for heat conduction between the portion of the aftertreatment module 24 it contacts and the first sensor ECU 71, however, the number of standoff members must also be adequate to provide positional rigidity to the first sensor thermal isolating arrangement 72. In the present embodiment, the two standoff members 100 each have a height "H1".

The two standoff members 100 are coupled to a first pair of thermally insulating spacers 101. In one embodiment, the first pair of thermally insulating spacers 101 may be made from a thermally insulating material such as mica or other materials with similar characteristics. The first pair of thermally insulating spacers 101 contact an enclosure 102 including a bottom plate 103 and a top plate 104. The enclosure 102 substantially surrounds the first sensor ECU 71 except on sides leading to the inlet NOx sensor 73 and the port 74. In the embodiment illustrated in FIGS. 4-6, the enclosure 102 surrounds four sides of the first sensor ECU 71. The enclosure 102 may be made of a material that reflects thermal radiation, e.g., aluminum, polished stainless steel, etc. Embodiments include configurations wherein the enclosure is relatively non-thermally conductive as compared to the housing 32.

The first sensor ECU 71 is coupled to the enclosure 102 with a second pair of thermally insulating spacers 105 disposed therebetween. The second pair of thermally insulating spacers 105 may have substantially the same characteristics as the first pair of thermally insulating spacers 101.

A pair of fasteners 106 couples a third pair of thermally insulating spacers 107, the first sensor ECU 71, the second pair of thermally insulating spacers 105, the enclosure 102, the first pair of thermally insulating spacers 101 and the two standoff members 100 to the appropriate portion of the aftertreatment module 24 (e.g., the mounting bracket 33). In the present embodiment, each fastener of the pair of fasteners 106 includes a bolt 108 and a washer 109. When the first sensor thermal isolating arrangement 72 is assembled, a bolt 108 of the pair of fasteners 106 passes through the washer 109, a spacer of the third pair of thermally insulating spacers 107, a through-hole in the first sensor ECU 71, a spacer of the second pair of thermally insulating spacers 105, through-holes in the enclosure 102, a spacer of the first pair of thermally insulating spacers 101 and one of the two standoff members 100. A distal end of the bolt 108 (e.g., a head of the bolt 108) contacts the spacer of the third pair of thermally insulating spacers 107. In one embodiment, the fasteners 106 may extend to be inserted into the mounting bracket 33.

The two standoff members 100 and the first and second pair of thermally insulating spacers 101 and 105 may create an air gap between the components to which they are immediately adjacent. For instance, the two standoff members 100 and the first pair of thermally insulating spacers 101 may create an air gap between the mounting bracket 33 and the enclosure 102 while the second pair of thermally insulating spacers 105 may create an air gap between the enclosure 102 and the first sensor ECU 71. These air gaps reduce paths for conduction of thermal energy from the portion of aftertreatment module 24 to which the mounting arrangement 70 is coupled to the first sensor ECU 71. The air in such gaps acts as an insulator when air currents are not flowing, and acts as a heat sink when air currents are flowing through the gaps. The benefits of such an arrangement will be discussed in more detail below with respect to the industrial applicability of the disclosure.

Figure 7:
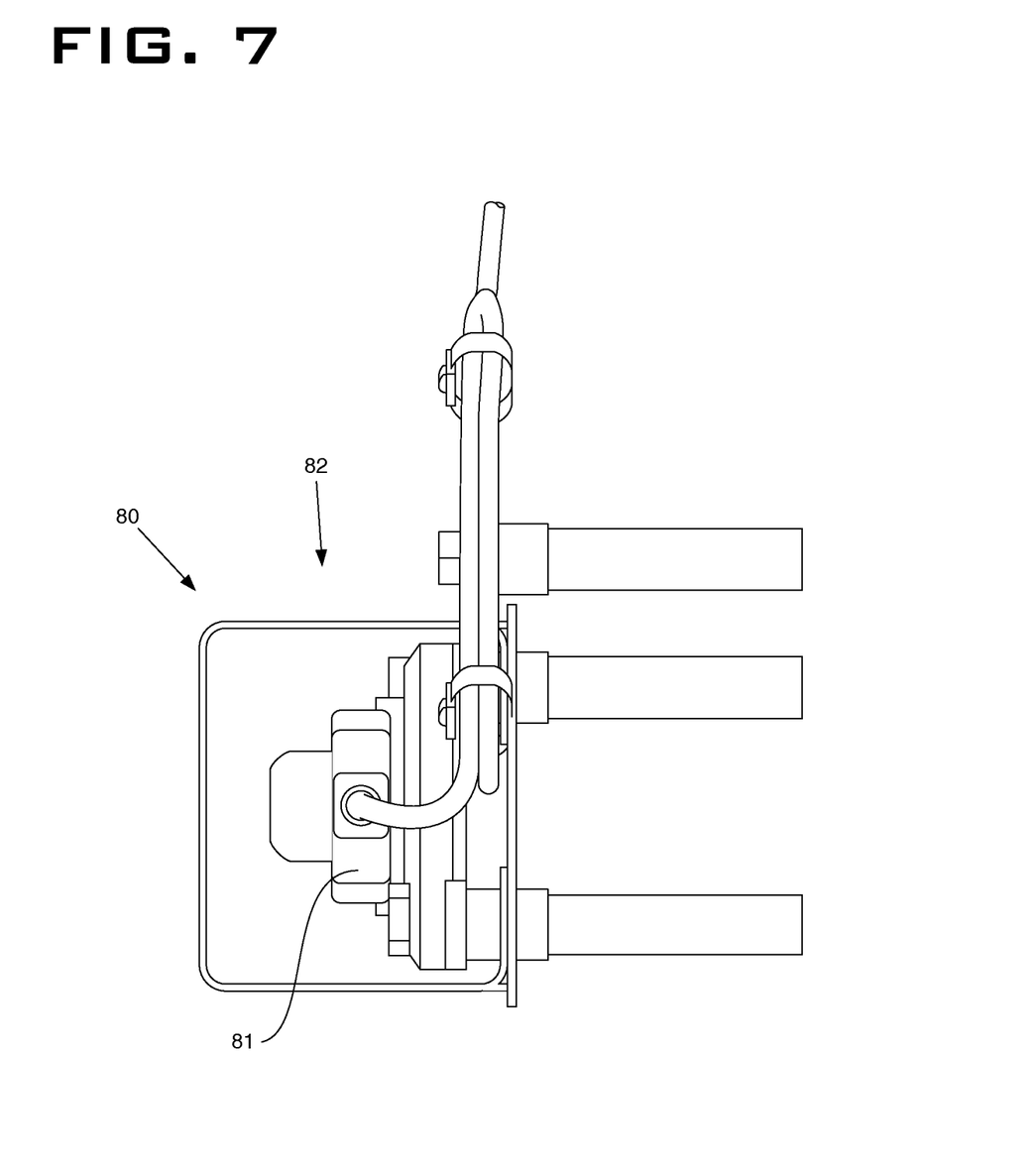
FIG. 7 is a side elevation view of an embodiment of an outlet sensor ECU and mounting arrangement of the disclosed sensor system.
Figure 8:
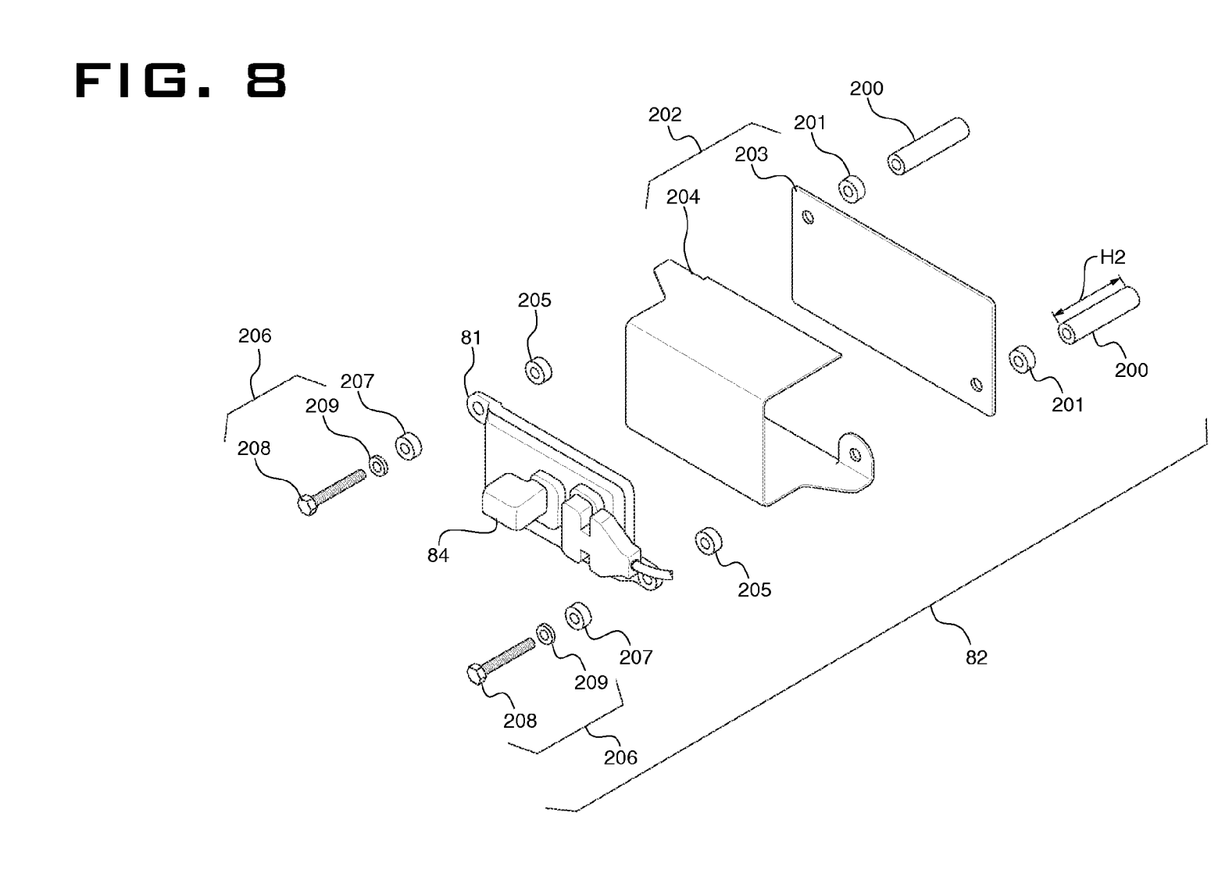
FIG. 8 is an exploded view of the outlet sensor ECU and mounting arrangement of the disclosed sensor system.

Referring now to FIGS. 4, 7 and 8, the second mounting arrangement 80 includes the outlet NOx sensor 83, the second sensor ECU 81 and the second sensor thermal isolating arrangement 82. The second sensor ECU 81 includes a port 84 for receiving the wiring harness 90 and a connection to the outlet NOx sensor 83. In the present embodiment, the second sensor thermal isolating arrangement 82 includes a plurality of components as described in detail below.

The second sensor thermal isolating arrangement 82 includes two standoff members 200. The two standoff members 200 may be made from a thermally insulating material relative to the housing 32 to which they are coupled. While the illustrated embodiment includes two standoff members 200, alternative embodiments may include additional standoff members (not shown) or fewer standoff members (not shown); in general a smaller number of standoff members decreases a flow path for heat conduction between the portion of aftertreatment module 24 it contacts and the second sensor ECU 81, however, the number of standoff members must also be adequate to provide positional rigidity to the second sensor thermal isolating arrangement 82. In the present embodiment, the two standoff members 200 each have a height "H2". The height H2 is different from the height H1 of the two standoff members 100; the height of the standoff members 100 and 200 are predetermined to produce desired temperatures at the respective first sensor ECU 71 and second sensor ECU 81.

The two standoff members 200 are coupled to a first pair of thermally insulating spacers 201. In one embodiment, the first pair of thermally insulating spacers 201 may be made from a thermally insulating material such as mica or other materials with similar characteristics. The first pair of thermally insulating spacers 201 contact an enclosure 202 including a bottom plate 203 and a top plate 204. The enclosure 202 substantially surrounds the second sensor ECU 81 except on sides leading to the outlet NOx sensor 83 and the port 84. In the embodiment illustrated in FIGS. 4, 7 and 8, the enclosure 202 surrounds four sides of the second sensor ECU 81. The enclosure 202 may be made of a material that reflects thermal radiation, e.g., aluminum, polished stainless steel, etc. Embodiments include configurations wherein the enclosure is relatively non-thermally conductive as compared to the housing 32.

The second sensor ECU 81 is coupled to the enclosure 202 with a second pair of thermally insulating spacers 205 disposed therebetween. The second pair of thermally insulating spacers 205 may have substantially the same characteristics as the first pair of thermally insulating spacers 201.

A pair of fasteners 206 couples a third pair of thermally insulating spacers 207, the second sensor ECU 81, the second pair of thermally insulating spacers 205, the enclosure 202, the first pair of thermally insulating spacers 201 and the two standoff members 200 to the appropriate portion of the aftertreatment module 24. In the present embodiment, each fastener of the pair of fasteners 206 includes a bolt 208 and a washer 209. When the second sensor thermal isolating arrangement 82 is assembled, a bolt 108 of the pair of fasteners 206 passes through the washer 209, a spacer of the third pair of thermally insulating spacers 207, a through-hole in the second sensor ECU 81, a spacer of the second pair of thermally insulating spacers 205, through-holes in the enclosure 202, a spacer of the first pair of thermally insulating spacers 201 and one of the two standoff members 200. A distal end of the bolt 208 (e.g., a head of the bolt 208) contacts the spacer of the third pair of thermally insulating spacers 207. In one embodiment, the fasteners 206 may extend to be inserted into the housing 32.

The two standoff members 200 and the first and second pair of thermally insulating spacers 201 and 205 may create an air gap between the components to which they are immediately adjacent. For instance, the two standoff members 200 and the first pair of thermally insulating spacers 201 may create an air gap between the housing 32 and the enclosure 202 while the second pair of thermally insulating spacers 205 may create an air gap between the enclosure 202 and the second sensor ECU 81. These air gaps reduce paths for conduction of thermal energy from the portion of the aftertreatment module 24 to which the second mounting arrangement 80 is coupled to the second sensor ECU 81. The air in such gaps acts as an insulator when air currents are not flowing, and acts as a heat sink when air currents are flowing through the gaps. The benefits of such an arrangement will be discussed in more detail below with respect to the industrial applicability of the disclosure.

Industrial Applicability

The aftertreatment module 24 of the present disclosure may be applicable to any power system 10 configuration where exhaust gas conditioning is desired. The sensor system 60 including both first mounting arrangement 70 and second mounting arrangement 80 may be used in such an aftertreatment module 24 to prevent premature failure of associated electronic components.

The aftertreatment module 24 may operate at temperatures exceeding 200° C. The first and second sensor ECUs 71 and 81 may have a failure threshold temperature significantly lower than a temperature of the aftertreatment module 24, e.g., the first and second sensor ECUs 71 and 81 may fail at temperatures exceeding 85° C. The first mounting arrangement 70, including the first sensor thermal isolating arrangement 72, maintains the temperature of the first ECU 71 below the failure threshold temperature through one or more mechanisms. First, the two standoff members 100 raise the first sensor ECU 71 away from a surface of the aftertreatment module 24, thereby limiting conductive heat transfer therebetween. Second, the first sensor ECU 71 is substantially surrounded on at least three sides by the enclosure 102, wherein the enclosure 102 reflects thermal radiation away from the first sensor ECU 71, e.g., the enclosure 102 may be reflective in at least the infrared wavelength of the electromagnetic spectrum. Third, the first sensor ECU 71 is thermally isolated from the standoff members 100 and the enclosure 102 by pairs of thermally insulating spacers 101, 105 and 107. In addition, the thermally insulating spacers 101, 105 and 107 create and/or enlarge air gaps between first sensor ECU 71 and the enclosure 102 and the enclosure 102 and the aftertreatment module 24. These air gaps may function as insulation between the first sensor ECU 71 and adjacent components, and may allow additional surfaces of the first mounting arrangement 70 to function as heat exchangers when air currents move therebetween as compared to configurations wherein the air gaps are not present.

Similarly, the second mounting arrangement 80, including the second sensor thermal isolating arrangement 82, maintains the temperature of the second sensor ECU 81 below the failure threshold temperature through one or more similar mechanisms. First, the two standoff members 200 raise the second sensor ECU 81 away from a surface of the aftertreatment module 24, thereby limiting conductive heat transfer therebetween. Second, the second sensor ECU 81 is substantially surrounded on at least three sides by the enclosure 202, wherein the enclosure 202 reflects thermal radiation away from the second sensor ECU 81, e.g., the enclosure 202 may be reflective in at least the infrared wavelength of the electromagnetic spectrum. Third, the second sensor ECU 81 is thermally isolated from the standoff members 200 and the enclosure 202 by pairs of thermally insulating spacers 201, 205 and 207. In addition, the thermally insulating spacers 201, 205 and 207 create and/or enlarge air gaps between second sensor ECU 81 and the enclosure 202 and the enclosure 202 and the aftertreatment module 24. These air gaps may function as insulation between the second sensor ECU 81 and adjacent components, and may allow additional surfaces of the second mounting arrangement 80 to function as heat exchangers when air currents move therebetween as compared to configurations wherein the air gaps are not present.

Essentially, the present disclosure discloses a method for mounting at least one electrical component, such as a first sensor ECU 71, within the aftertreatment module 24, the method including providing a first sensor ECU 71, thermally isolating the first sensor ECU 71 from a surface of the aftertreatment module 24 and reflecting thermal energy away from the first sensor ECU 71.

It will be apparent to those skilled in the art that various modifications and variations can be made to the exhaust system 20 and aftertreatment module 24 of the present disclosure without departing from the scope of the disclosure. Other embodiments will be apparent to those skilled in the art from consideration of the specification and practice of the system and module disclosed herein. It is intended that the specification and examples be considered as exemplary only, with a true scope of the disclosure being indicated by the following claims and their equivalent.

What is claimed is:

1. An arrangement for mounting at least one electrical component to a portion of an aftertreatment module, the arrangement comprising:
   at least one standoff member coupled between the electrical component and the portion of the aftertreatment module;
   an enclosure substantially surrounding at least three sides of the electrical component;

at least one first spacer disposed between the electrical component and the enclosure;

at least one fastener configured to couple the electronic control unit the enclosure; and at least one second spacer disposed between a distal end of the at least one fastener and the electrical component, wherein the at least one third spacer comprises a thermally insulating material.

2. The arrangement of claim 1, further comprising at least one third spacer respectively disposed between each of the at least one standoff member and the enclosure.

3. The arrangement of claim 2, wherein the at least one third spacer comprises a thermally insulating material.

4. The arrangement of claim 3, wherein the thermally insulating material is mica.

5. The arrangement of claim 1, wherein the at least one first spacer comprises a thermally insulating material.

6. The arrangement of claim 5, wherein the thermally insulating material is mica.

7. The arrangement of claim 1, wherein the enclosure substantially surrounds at least four sides of the electrical component.

8. The arrangement of claim 1, further comprising an air gap disposed between the electrical component and the enclosure.

9. The arrangement of claim 1, wherein the enclosure is configured to reflect radiant thermal energy away from the electrical component.

10. The arrangement of claim 1, wherein the at least one standoff member includes less than three standoff members.

* * * * *